(12) United States Patent
Riani et al.

(10) Patent No.: US 7,987,396 B1
(45) Date of Patent: Jul. 26, 2011

(54) REDUCING BIT-ERROR RATE USING ADAPTIVE DECISION FEEDBACK EQUALIZATION

(75) Inventors: Jamal Riani, Santa Clara, CA (US); Haoli Qian, Fremont, CA (US)

(73) Assignee: Marvell International Ltd., Hamilton (BM)

( * ) Notice: Subject to any disclaimer, the term of this patent is extended or adjusted under 35 U.S.C. 154(b) by 140 days.

(21) Appl. No.: 12/556,483

(22) Filed: Sep. 9, 2009

Related U.S. Application Data

(60) Provisional application No. 61/095,760, filed on Sep. 10, 2008.

(51) Int. Cl.
*G06F 11/00* (2006.01)

(52) U.S. Cl. .......... 714/704; 714/709

(58) Field of Classification Search .......... 375/231, 375/233; 708/322; 360/31; 329/315; 341/143; 714/704, 709
See application file for complete search history.

(56) References Cited

U.S. PATENT DOCUMENTS

| | | | | |
|---|---|---|---|---|
| 4,789,994 A | * | 12/1988 | Randall et al. | 375/233 |
| 5,909,384 A | * | 6/1999 | Tal et al. | 708/322 |
| 7,158,324 B2 | * | 1/2007 | Stein et al. | 360/31 |
| 7,203,232 B2 | * | 4/2007 | Ahn | 375/231 |
| 7,330,068 B2 | * | 2/2008 | Barksdale | 329/315 |
| 2006/0146926 A1 | * | 7/2006 | Bhoja et al. | 375/233 |
| 2009/0135035 A1 | * | 5/2009 | Fifield | 341/143 |

* cited by examiner

*Primary Examiner* — David Ton (57) ABSTRACT

The present specification describes techniques and apparatus that adjust filter tap values to be used in filtering a data value input to a detector and/or that increase or decrease a threshold value used to determine whether to adjust the filter tap values.

20 Claims, 5 Drawing Sheets

REDUCING BIT-ERROR RATE USING ADAPTIVE DECISION FEEDBACK EQUALIZATION

RELATED APPLICATIONS

This application claims priority under 35 U.S.C. §119(e) to U.S. Provisional Patent Application Ser. No. 61/095,760, filed on Sep. 10, 2008, the disclosure of which is hereby incorporated by reference herein in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A detection system can be used to detect values encoded in particular signals. However, such detection can be difficult because the signals can be subjected to interference or noise. One type of interference or noise is from within the signal itself, with one portion of the signal encoding one value interfering with another portion of the signal encoding another value. Such interference is also referred to as ISI (inter-symbol interference). One technique for filtering out ISI is a LMS (least mean square) scheme, which is based on minimizing the power of an error signal.

SUMMARY

This Summary is provided to introduce subject matter that is further described below in the Detailed Description. Accordingly, the Summary should not be considered to describe essential features nor used to limit the scope of the claimed subject matter.

A method is described that includes receiving, by a detector, a filtered data value. The method further includes determining whether the filtered data value meets a threshold value, and if the filtered data value meets the threshold value then adjusting a filter tap to be used in filtering a data value input to the detector. The method can further include leaving the filter tap unchanged if the filtered data value does not meet the threshold value. The method can also further include decreasing the threshold value if the filtered data value meets the threshold value, and otherwise increasing the threshold value. Additionally, the adjusting the filter tap can cause the data value input to the detector to go towards a value of +1 or a value of −1.

Another method is also described. The method includes receiving, at a detector, a first filtered data value. The method further includes determining whether the first filtered data value meets a threshold value, wherein the threshold value is used to determine whether to adjust a filter tap for filtering a second filtered data value, and if the first filtered data value meets the threshold value then decreasing the threshold value, otherwise increasing the threshold value. The determining can further include determining whether an absolute value of the first filtered data value meets the threshold value. The decreasing the threshold value can further include decreasing the threshold value by a first value, wherein increasing the threshold value comprises increasing the threshold value by a second value, and wherein the first value is less than the second value.

A detection system is also described. The detection system includes a filter adapter configured to receive, at a detector, a filtered data value, determine whether the filtered data value meets a threshold value, and if the filtered data value meets the threshold value then modify a filter tap to be used in filtering subsequent data values. The detection system further includes a threshold value adapter configured to decrease the threshold value by a first amount if the filtered data value meets the threshold value, and increase the threshold value by a second amount if the filtered data value does not meet the threshold value. The filter tap adapter can be further configured wherein to modify the filter tap is to cause the subsequent data values to go towards values of +1 or −1.

BRIEF DESCRIPTION OF THE DRAWINGS

The same numbers are used throughout the drawings to reference like features.

DETAILED DESCRIPTION

Reducing bit-error rate using adaptive decision feedback equalization is discussed herein. Generally, an input signal is converted to a data value that is filtered based on a decision feedback equalization (DFE) filter equalizer. The filtered data value is then input to a detector that detects one of multiple values that the filtered data value represents (e.g., detects whether the filtered data value represents a value of +1 or a value of −1). The DFE filter equalizer uses previously detected values to adjust taps of the filter, thus adapting the filter over time. These changes result in the filtered signals converging towards values of +1 and −1, thereby reducing a bit-error rate of a detection system.

Figure 1:
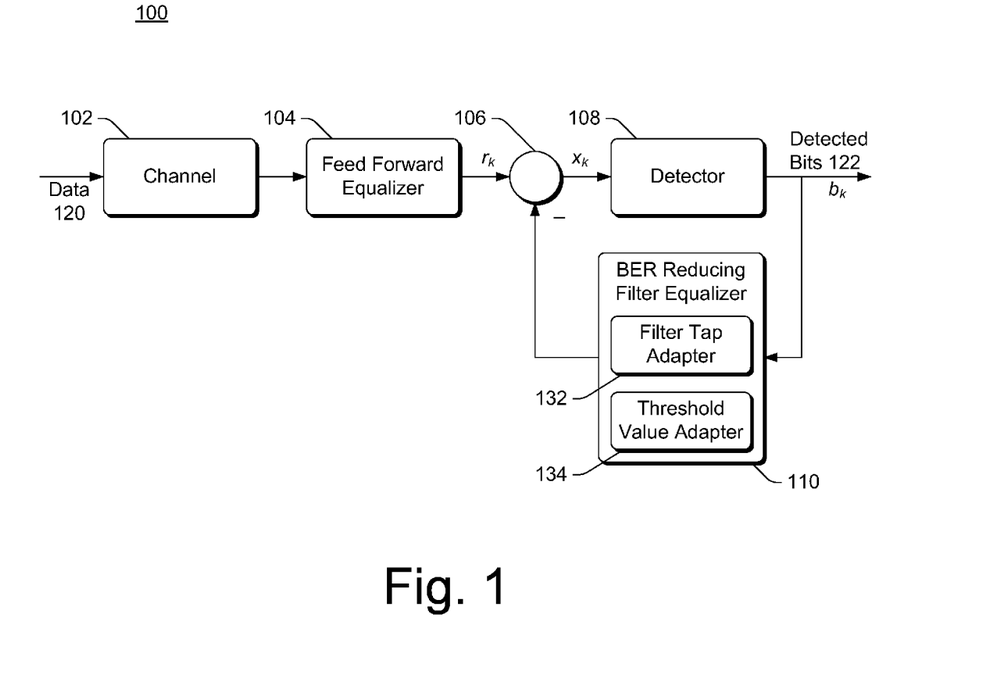
FIG. 1 is a block diagram illustrating an example detection system implementing bit-error rate reduction in accordance with one or more embodiments.

FIG. 1 is a block diagram illustrating an example detection system 100 implementing bit-error rate reduction in accordance with one or more embodiments. System 100 includes a channel 102, a feed forward equalizer 104, a filter 106, a detector 108, and a bit-error rate (BER) reducing filter equalizer 110. Data 120 is received into system 100 via a channel 102. Channel 102 is a transmission channel and can be a variety of different media via which data can be transferred. For example, channel 102 can be wired media, wireless media, magnetic storage media, optical storage media, solid state storage media, and so forth.

Channel 102 transmits data 120 encoded in analog signals. Data 120 is a series of bits that can be encoded in analog signals in a variety of different manners, such as using binary phase-shift keying (BPSK). Regardless of the manner in which the data is encoded, individual bits encoded in the analog signals can be extracted by analyzing a particular portion or slice of the analog signal. The value of the analog signal for a particular portion or slice is analyzed, as discussed in more detail below, and the particular bit encoded therein is output by detector 108. Each particular portion or slice can be identified by channel 102, or alternatively another component of system 100 (e.g., feed forward equalizer 104 or another component not illustrated).

Channel 102 provides data 120 to feed forward equalizer 104, which in turn attempts to remove some interference from data 120. Such interference is oftentimes the result of other parts of data 120 (other bits encoded in data 120), and can also be referred to as ISI (inter-symbol interference). Feed forward equalizer 104 operates to remove precursor ISI (which refers to ISI introduced from future bits encoded in data 120). BER reducing filter equalizer 110, discussed in more detail below, operates to remove postcursor ISI (which refers to ISI introduced from past or previous bits encoded in data 120). Feed forward equalizer 104 can operate in a variety of different manners using a variety of different conventional techniques to remove precursor ISI. The data output from feed forward equalizer 104 is illustrated as data $r_k$. Each data value $r_k$ refers to a value of an analog signal of a portion or slice of data 120, as modified by feed forward equalizer 104. This value can take different forms based on the manner in which data 120 is encoded in the analog signals, and can be, for example, a value indicating a voltage of the particular portion of slice.

Filter 106 alters the data values $r_k$ received from feed forward equalizer 104 to generate filtered data values $x_k$. Filter 106 filters the data values $r_k$ based at least in part on one or more constants or filter coefficients, which are also referred to as filter taps. Given different filter taps, different filtered data values $x_k$ are generated from the same data values $r_k$.

The filtered data values $x_k$ are input to detector 108, which detects, for each filtered data value $x_k$, one of multiple values that the filtered data value $x_k$ represents. In one or more embodiments detector 108 detects whether the filtered data value $x_k$ is a value of +1 or −1, although detection of other values can alternatively be performed. The output of detector 108 is the detected bits 122 ($b_k$). The detected bits 122 are output by system 100 to another component (not shown), and also fed back to BER reducing filter equalizer 110.

BER reducing filter equalizer 110 includes a filter tap adapter 132 and a threshold value adapter 134. Threshold value adapter 134 adapts a threshold value T used by BER reducing filter equalizer 110 in determining whether to adapt the filter taps as discussed in more detail below. Filter tap adapter 132 selectively alters the filter taps of filter 106, adapting the filter taps based on detected bits 122. Whether filter tap adapter 132 alters the filter taps of filter 106 at any particular time is dependent on the value of the most-recently-filtered data value $x_k$. If the most-recently-filtered data value $x_k$ is within a particular range (e.g., the absolute value of the most-recently-filtered data value $x_k$ is less than the threshold value T), then filter tap adapter 132 adapts the filter taps. Filter tap adapter 132 adapts the filter taps so that the next filtered data value $x_k$, as well as other subsequent filtered data values $x_k$, is adjusted or pushed by filter 106 to be closer to a value of +1 or −1. However, if the most-recently-filtered data value $x_k$ is not within the particular range (e.g., the absolute value of the most-recently-filtered data value $x_k$ is not less than the threshold value T), then filter tap adapter 132 does not adapt the filter taps. Filter tap adapter 132 can obtain the filtered data values $x_k$ from different components, such as from filter 106 (not shown) or detector 108.

In one or more embodiments, detector 108 can also output an error signal (not shown). For a given detected bit $b_k$, the error signal is based on the difference between the detected bit $b_k$ and the filtered data value $x_k$ from which the given bit $b_k$ was detected. However, BER reducing filter equalizer 110 need not use this error signal nor base its adaptation of the filter taps on this error signal. Rather, BER reducing filter equalizer 110 selectively (based on the detected bits $b_k$) adapts the filter taps based on the filtered data values $x_k$.

Figure 2:
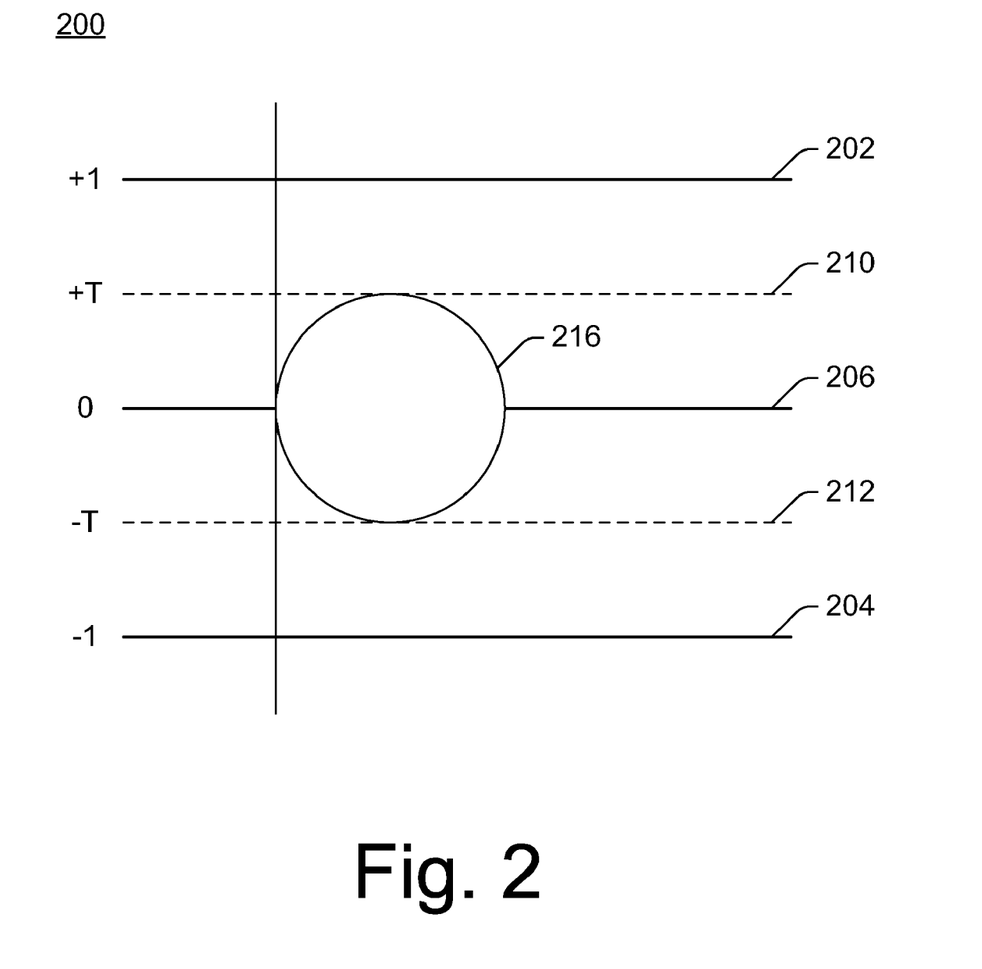
FIG. 2 is a graph illustrating an example of adjusting of filter taps in accordance with one or more embodiments.

FIG. 2 is a graph illustrating an example of the adjusting of filter taps in accordance with one or more embodiments. In graph 200, a line 202 represents the value +1, a line 204 represents the value −1, and a line 206 represents the value 0. Additionally, a line 210 represents a value +T and a line 212 represent a value −T, where T refers to a threshold value.

Filter tap adapter 132 operates to adjust the filter taps so that the filtered data values $x_k$ are close to +1 or −1, resulting in the filtered data values $x_k$ converging towards +1 and −1 over time. The area between lines 210 and 212 (between the threshold values +T and −T) defines the region for which BER reducing filter equalizer 110 adapts the filter taps. These threshold values +T and −T are also referred to as the absolute value of T (and thus simply the threshold value T).

The region for which BER reducing filter equalizer 110 adapts the filter taps is also shown in graph 200 as an eye opening 216. For a particular filtered data value $x_k$, if the filtered data value $x_k$ falls within eye opening 216 then filter tap adapter 132 adapts the filter taps; otherwise, filter tap adapter 132 does not adapt the filter taps. Thus, a filtered data value $x_k$ that lies beyond eye opening 216 (e.g., greater than +T or less than −T) does not affect the filter taps; such a filtered data value $x_k$ can be deemed to be reliable enough (close enough to the detected bit value of +1 or −1) that it need not trigger a change in the filter taps.

Additionally, as the filter taps are adapted over time, the threshold values +T and −T can be adjusted as discussed in more detail below. This has the effect of increasing the eye opening 216. BER reducing filter equalizer 110 operates to increase the size of eye opening 216 over time, resulting in filtered data values $x_k$ being pushed closer to +1 and −1. This can also be viewed as unfiltered data values (e.g., data values $r_k$ of FIG. 1) that would otherwise fall within eye opening 216 are filtered so that they fall outside of eye opening 216. As more values are pushed closer to +1 and −1, the bit-error rate of detector 108 is reduced.

Returning to FIG. 1, in one or more embodiments filter tap adapter 132 operates to adapt the filter taps in accordance with various algorithms or functions. Examples of these algorithms or functions are included below, although it is to be appreciated that these are examples and that other algorithms or functions can alternatively be used.

The filter taps are adapted according to the following cost function:

$$\Delta(f,T)=|x_k|1_{\{|x_k|<T\}} \qquad (1)$$

where f is the filter taps, T is the threshold value, and $x_k$ is the filtered data values. Additionally, $1_{\{Y\}}$ is a value of 1 if Y is true, and a value of 0 otherwise. Accordingly, $1_{\{|x_k|<T\}}$ refers to a value of 1 if the absolute value of $x_k$ is less than the threshold value T, and is 0 if the absolute value of $x_k$ is not less than the threshold value T. By operating to increase (e.g., maximize) the cost function (1), the result of filter tap adapter 132 is that the filtered data values $x_k$ are pushed so that $|x_k| \geq T$.

During operation, initial values of f and T are set in a variety of different manners. For example, f can have an initial value of 0, and T can have an initial value set empirically by a designer or user of system 100 based on known or anticipated ISI. One such initial value of T is 0.5, although other initial values can alternatively be used.

Taking the partial derivative of the cost function (1) with respect to a single filter tap f, the adaptation function for a particular filter tap is as follows:

$$f_i^{new}=f_i^{old}-\mu b_k b_{k-i} E_k\, i \geq 1 \qquad (2)$$

where $f_0=0$, $f_i^{new}$ is the new value of the filter tap, $f_i^{old}$ is the previous value of that same filter tap, $E_k=1_{\{|x_k|<T\}}$, $b_k$ is the most recently detected bit 122, $b_{k-i}$, is the (i+1)th most recently detected bit 122 (so that $b_k$ and $b_{k-1}$ are the two most recently detected bits 122), and μ is an adaptation step size.

As can be seen from the adaption function (2), the new filter tap value is the previous filter tap value selectively updated by a particular value $\mu b_k b_{k-i}$. The value $E_k$ provides the selectivity and can also be viewed as an enable bit (enabling or disabling adaptation of the filter taps). The value $E_k$ provides the selectivity because the value $\mu b_k b_{k-i} E_k$ is 0 if the value $E_k$ is 0 (so filter tap adaptation is effectively disabled if the absolute value of $x_k$ is not less than the threshold value T), and the value $\mu b_k b_{k-i} E_k$ is non-zero if the value $E_k$ is 1 (so filter tap adaptation is effectively enabled if the absolute value of $x_k$ is less than the threshold value T). If adaptation of the filter taps is enabled (the value $E_k$ is 1), then the previous filter tap value is increased by the value μ if one of $b_k$ and $b_{k-i}$ is +1 while the other is −1, and is decreased by the value of μ if both $b_k$ and $b_{k-i}$ are +1 or both −1.

The value μ can be set to a variety of different values. The value μ defines a time constant of the adaptation loop (the time the adaptation takes to converge). In one or more embodiments, the value μ is set by the designer or user of system 100 based on various criteria of the designer or user, and can be set as a function of how fast the channel varies. These criteria can be based on the realization that smaller values of μ result in a more robust convergence and smaller residue resulting from an occasional ISI term, but a slower convergence of the filtered data values $x_k$ to +1 and −1.

In one or more embodiments, the value μ is a fixed value and remains the same during the operation of system 100. In other embodiments, the value μ is a dynamic value that changes during the operation of system 100. When and/or how much to change the value μ can be determined in different manners, such as based on how many bits have been detected by system 100 (e.g., the value μ can be initially a larger value and become smaller as more bits are detected by system 100), based on how many bits fall between +T and −T (e.g., the value μ can be decreased as the number of bits that fall between +T and −T decreases), and so forth.

Figure 3:
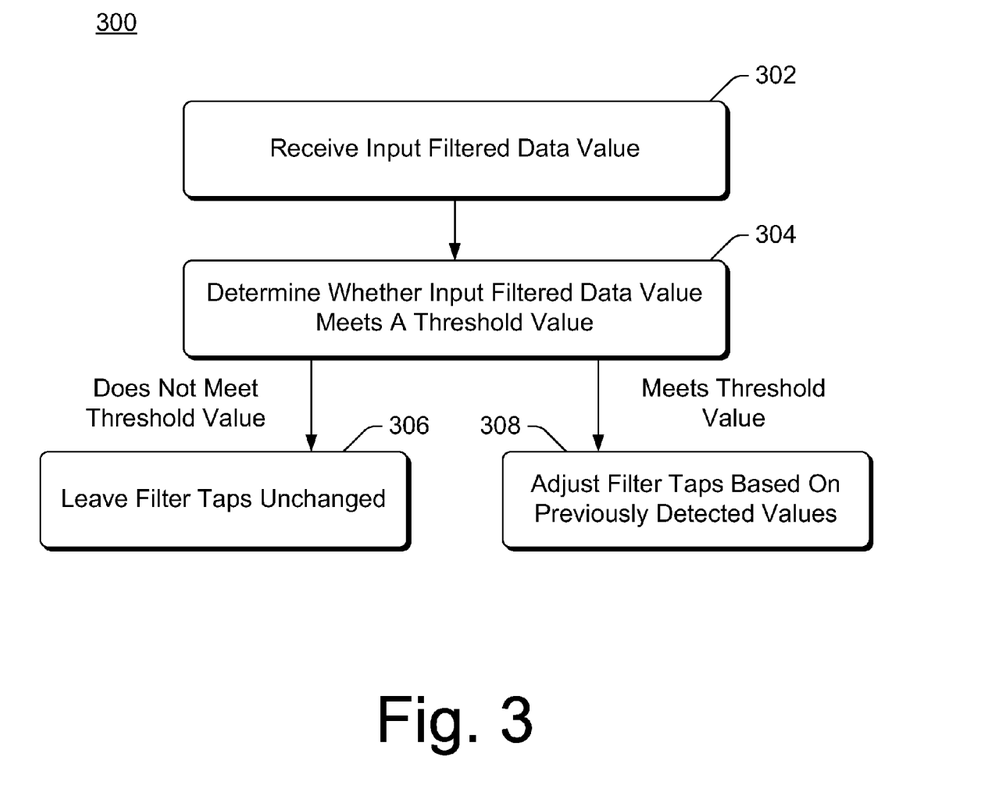
FIG. 3 is a flowchart illustrating an example method for adapting filter taps in accordance with one or more embodiments.

FIG. 3 is a flowchart illustrating an example method 300 for adapting filter taps in accordance with one or more embodiments. Aspects of method 300 may be implemented in hardware, firmware, software, or a combination thereof. Method 300 is described in the form of a set of operations to be performed, and the operations are not necessarily limited to the order shown. The operations performed in method 300 can be performed by a filter tap adapter, such as filter tap adapter 132 of BER reducing filter equalizer 110 of FIG. 1.

At 302, the filter tap adapter receives an input filtered value. This input filtered value is a filtered data value $x_k$ input to a detector, which in turn detected a recent detected bit $b_k$. This input filtered value can be the most recently input filtered value, or alternatively an input filtered value further back in time. The input filter value can be received, for example, from the filter.

At 304, the filter tap adapter determines whether the input filtered data meets a threshold value. This determination is determining whether the absolute value of the input filtered data value $x_k$ meets the threshold value T. The absolute value of the input filtered data value $x_k$ meets the threshold value T if the absolute value of the input filtered data value $x_k$ is less than or equal to (or alternatively is less than) the threshold value T; otherwise, the absolute value of the input filtered data value $x_k$ does not meet the threshold value T.

At 306, if the input filtered data value does not meet the threshold value, then the filter tap adapter leaves the filter taps unchanged.

At 308, however, if the input filtered data value meets the threshold value, then the filter tap adapter adjusts the filter taps based on previously detected values. These previously detected values are, for example, the $b_k$ and $b_{k-i}$ values discussed above.

Returning to FIG. 1, BER reducing filter equalizer 110 can also modify or adapt the threshold value T over time. Generally, threshold value adapter 134 modifies the threshold value T over time so that a particular number of filtered data values $x_k$ fall between +T and −T. This particular number can be, for example, a particular percentage of the filtered data values $x_k$. Alternatively, threshold value adapter 134 can modify the threshold value T based on other criteria, such as a frequency with which filtered data values $x_k$ fall between +T and −T, how close particular filtered data values $x_k$ are to +T and −T, and so forth.

The modification of the threshold value T can be performed over time concurrently with the adapting of the filter taps discussed above. For example, for each detected bit 122, threshold value adapter 134 can determine whether to modify the threshold value T (and if so by how much) and filter tap adapter 132 can also determine whether to adapt the filter taps (and if so by how much). Alternatively, the modification of the threshold value T can be performed sequentially over time. For example, for a particular number of detected bits 122 or an amount of time, threshold value adapter 134 can determine whether to modify the threshold value T (and if so by how much) but filter tap adapter 132 does not determine whether to adapt the filter taps. For a next particular number of detected bits 122 or amount of time, filter tap adapter 132 can determine whether to adapt the filter taps (and if so by how much) but threshold value adapter 134 does not determine whether to modify the threshold value T.

In one or more embodiments, threshold value adapter 134 operates to modify the threshold value T in accordance with various algorithms or functions. Examples of these algorithms or functions are included below, although it is to be appreciated that these are examples and that other algorithms or functions can alternatively be used.

One example manner in which the threshold value T can be modified is based on fixing the average DFE adaptation enabling rate (also referred to as the expectation of $E_k$, or $E[E_k]$). In this manner, the adaptation of the threshold value T is performed according to the following adaptation function:

$$T^{new} = T^{old} - \eta E_k + \frac{\eta}{M}(1 - E_k) \quad (3)$$

where $T^{new}$ is the new threshold value, $T^{old}$ is the previous threshold value, η is a threshold step size, $E_k=1_{\{|x_k|<T\}}$ and is 0 or 1 based on whether the absolute value of $x_k$ is less than the threshold value T as discussed above, and M refers to a desired DFE adaptation enabling rate. Typical values of M are 64, 128, 256, 512, and 1024. At convergence to the desired DFE adaptation enabling rate, the following holds:

$$E[E_k] = \frac{1}{M+1} \quad (4)$$

The value M can be set by the designer or user of system 100 based on various criteria of the designer or user. In one or more embodiments, the value M is set empirically by the designer or user of system 100.

The value η can be set by the designer or user of system 100 based on various criteria of the designer or user. Similar to the value μ discussed above, the value η defines the speed of convergence of the threshold value T. In one or more embodiments, the value η is chosen to be of the same order of magnitude as the value μ.

As can be seen from the adaptation function (3), the threshold value is either increased or decreased based on the value $E_k$. If the value $E_k$ is 0, then the threshold value T is increased by the value $$\frac{\eta}{M}.$$

However, if the value $E_k$ is 1, then the threshold value T is decreased by the value η. Although adaptation function (3) is discussed as using two different values for increasing and decreasing the threshold value T, alternatively the same values can be used.

BER reducing filter equalizer 110 is discussed above as including both filter tap adapter 132 and threshold value adapter 134. Alternatively, both filter tap adapter 132 and adapter 134 need not be included in BER reducing filter equalizer 110. For example, if BER reducing filter equalizer 110 were to perform filter tap adaptation but not threshold value adaptation, then threshold value adapter 134 need not be included in BER reducing filter equalizer 110.

Figure 4:
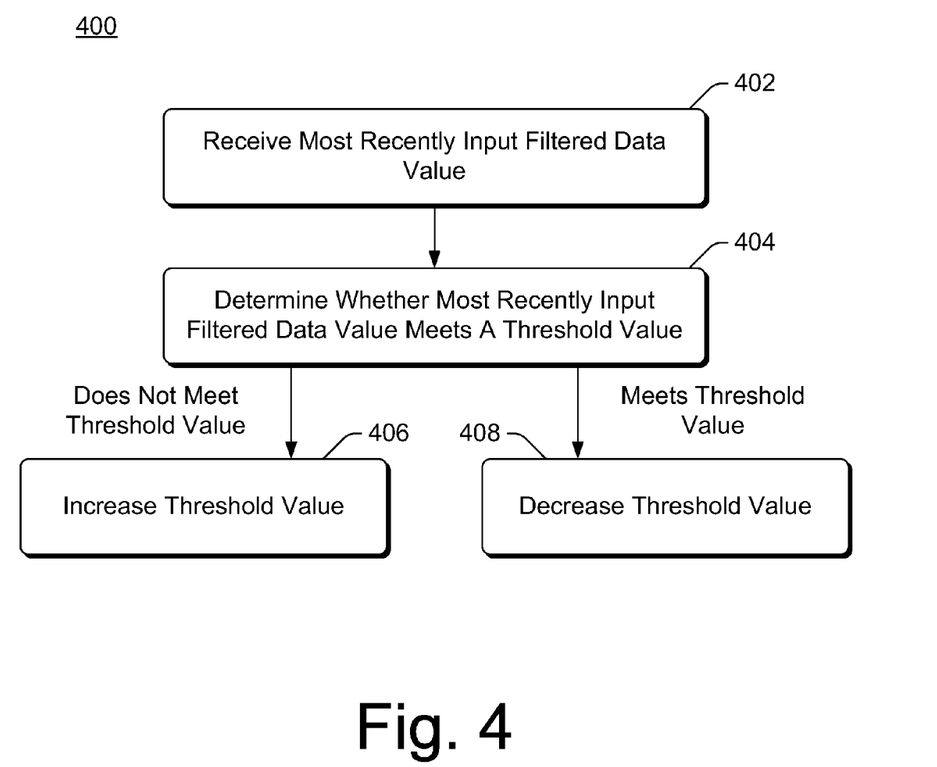
FIG. 4 is a flowchart illustrating an example method for modifying the threshold value in accordance with one or more embodiments.

FIG. 4 is a flowchart illustrating an example method 400 for modifying the threshold value in accordance with one or more embodiments. Aspects of method 400 may be implemented in hardware, firmware, software, or a combination thereof. Method 400 is described in the form of a set of operations to be performed, and the operations are not necessarily limited to the order shown. The operations performed in method 400 can be performed by a threshold value adapter, such as threshold value adapter 134 of BER reducing filter equalizer 110 of FIG. 1.

At 402, the threshold value adapter receives a recently input filtered value. This recently input filtered value is a filtered data value $x_k$ input to a detector, which in turn detected a recent detected bit $b_k$. This recently input filtered value can be the most recently input filtered value, or alternatively an input filtered value further back in time. The input filter value can be received, for example, from the filter.

At 404, the threshold value adapter determines whether the recently input filtered data value meets a threshold value. This determination is, as discussed above, determining whether the absolute value of the recently input filtered data value $x_k$ is less than or equal to (or alternatively is less than) the threshold value T.

At 406, if the recently input filtered data value does not meet the threshold value, then the threshold value adapter increases the threshold value. The amount by which the threshold value is increased can vary, and can be, for example, the value $$\frac{\eta}{M}$$

discussed above.

At 408, however, if the recently input filtered data value meets the threshold value, then the threshold value adapter decreases the threshold value. The amount by which the threshold value is decreased can vary, and can be, for example, the value η discussed above.

The adaptive decision feedback equalization techniques discussed herein are discussed with reference to most recent values, such as the most-recently-filtered data value $x_k$ and the most recently detected value $b_k$. It is to be appreciated, however, that the techniques discussed herein can similarly be used with other detected values regardless of how recently the values were detected. For example, the techniques discussed herein can be used with values that are delayed for some number of values or some amount of time (e.g., values that were filtered or detected 100 milliseconds in the past, or after 10 or 20 other values have been filtered or detected).

Figure 5:
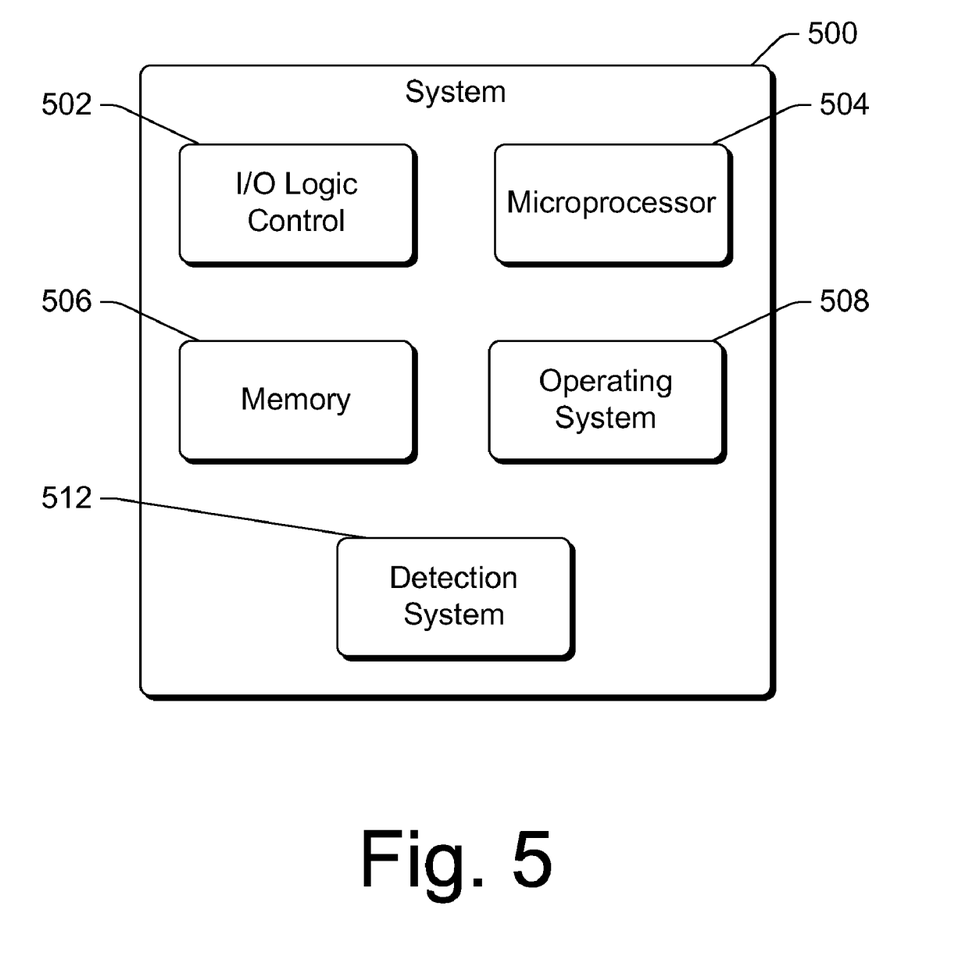
FIG. 5 illustrates an example system that can implement various embodiments described herein.

FIG. 5 illustrates an example system 500 that can implement various embodiments described above. System 500 can be implemented in a variety of different fixed or mobile device, such as one or a combination of a media device, computer device, television set-top box, video processing and/or rendering device, appliance device, gaming device, electronic device, vehicle, workstation, and/or in any other type of computing device. System 500 can be implemented as a System-on-Chip (SoC).

System 500 can be integrated with electronic circuitry, a microprocessor, memory, input-output (I/O) logic control, communication interfaces and components, other hardware, firmware, and/or software to run a device, and so forth. System 500 can also include an integrated data bus (not shown) that couples the various components of the system for data communication between the components. A device that includes system 500 can also be implemented with many combinations of differing components.

In this example, system 500 includes various components such as an input-output (I/O) logic control 502 (e.g., to include electronic circuitry) and a microprocessor 504 (any of a microcontroller, central processing unit (CPU), digital signal processor, etc.). System 500 also includes a memory 506, which can be any type of random access memory (RAM), a low-latency nonvolatile memory (e.g., flash memory), read only memory (ROM), and/or other suitable electronic data storage. System 500 can also include various firmware and/or software, such as an operating system 508, which can be computer-executable instructions maintained by memory 506 and executed by microprocessor 504. System 500 can also include other various communication interfaces and components, wireless LAN (WLAN) or PAN (WPAN) components, other hardware, firmware, and/or software.

System 500 includes a detection system 512. Detection system 512 can be, for example, a detection system 100 of FIG. 1. Examples of the detection system and its functionality are described above.

One or more of the methods or techniques described above can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk.

Current examples of optical disks include compact disk-read only memory (CD-ROM), compact disk-read/write (CD-R/W) and DVD.

Although the subject matter has been described in language specific to structural features and/or methodological operations, it is to be understood that the subject matter defined in the appended claims is not necessarily limited to the specific features or operations described above, including orders in which they are performed.

What is claimed is:

1. A method comprising:
receiving, by a detector, a filtered data value;
determining whether the filtered data value meets a threshold value; and
if the filtered data value meets the threshold value then adjusting a filter tap to be used in filtering a data value input to the detector.

2. A method as recited in claim 1, further comprising leaving the filter tap unchanged if the filtered data value does not meet the threshold value.

3. A method as recited in claim 1, further comprising decreasing the threshold value if the filtered data value meets the threshold value, and otherwise increasing the threshold value.

4. A method as recited in claim 3, wherein $T^{old}$ is a previous threshold value, $T^{new}$ is a new threshold value, $\eta$ is a threshold step size, M is a desired decision feedback equalization adaptation enabling rate, and a value $E_k$ is set to 0 if the filtered data value is not below the threshold value and set to 1 if the filtered data value is below the threshold value, and the new threshold value is determined as:

$$T^{new} = T^{old} - \eta E_k + \frac{\eta}{M}(1 - E_k).$$

5. A method as recited in claim 1, wherein the determining comprises determining whether an absolute value of the filtered data value meets the threshold value.

6. A method as recited in claim 1, wherein the filtered data value is a value from which the detector detected a most recent detected bit.

7. A method as recited in claim 1, wherein the adjusting causes the data value input to the detector to go towards a value of +1 or a value of −1.

8. A method as recited in claim 1, wherein the adjusting comprises adjusting the filter tap based on bits detected by the detector, the bits including a most recently detected bit and a second most recently detected bit.

9. A method as recited in claim 1, wherein $f_i^{old}$ is a previous filter tap value, $f_i^{new}$ is a new filter tap value, $b_k$ is a most recently detected bit, $b_{k-i}$ is an (i+1)th most recently detected bit, $\mu$ is an adaptation step size, and a value $E_k$ is set to 0 if the filtered data value is not below the threshold value and set to 1 if the filtered data value is below the threshold value, and the new filter tap value is determined as:

$$f_i^{new} = f_i^{old} - \mu b_{k-i} E_k.$$

10. A method comprising:
receiving, at a detector, a first filtered data value;
determining whether the first filtered data value meets a threshold value, wherein the threshold value is used to determine whether to adjust a filter tap for filtering a second filtered data value; and
if the first filtered data value meets the threshold value then decreasing the threshold value, otherwise increasing the threshold value.

11. A method as recited in claim 10, wherein the determining comprises determining whether an absolute value of the first filtered data value meets the threshold value.

12. A method as recited in claim 10, wherein decreasing the threshold value comprises decreasing the threshold value by a first value, wherein increasing the threshold value comprises increasing the threshold value by a second value, and wherein the first value is less than the second value.

13. A method as recited in claim 10, wherein $T^{old}$ is a previous threshold value, $T^{new}$ is a new threshold value, $\eta$ is a threshold step size, M is a desired decision feedback equalization adaptation enabling rate, and a value $E_k$ is set to 0 if the first filtered data value is not below the threshold value and set to 1 if the first filtered data value is below the threshold value, and the new threshold value is determined as:

$$T^{new} = T^{old} - \eta E_k + \frac{\eta}{M}(1 - E_k).$$

14. A detection system comprising:
a filter tap adapter configured to:
receive, at a detector, a filtered data value,
determine whether the filtered data value meets a threshold value, and
if the filtered data value meets the threshold value then modify a filter tap to be used in filtering subsequent data values; and
a threshold value adapter configured to:
decrease the threshold value by a first amount if the filtered data value meets the threshold value, and
increase the threshold value by a second amount if the filtered data value does not meet the threshold value.

15. A detection system as recited in claim 14, wherein the detection system is implemented as a System-on-Chip (SoC).

16. A detection system as recited in claim 14, wherein the first amount is less than the second amount.

17. A detection system as recited in claim 14, wherein $f_i^{old}$ is a previous filter tap value, $f_i^{new}$ is a new filter tap value, $b_k$ is a most recently detected bit, $b_{k-i}$ is an (i+1)th most recently detected bit, $\mu$ is an adaptation step size, and a value $E_k$ is set to 0 if the filtered data value is not below the threshold value and set to 1 if the filtered data value is below the threshold value, and the filter tap adapter is configured to modify the filter tap by determining the new filter tap value as:

$$f_i^{new} = f_i^{old} - \mu b_{k-i} E_k.$$

18. A detection system as recited in claim 17, wherein $T^{old}$ is a previous threshold value, $T^{new}$ is a new threshold value, $\eta$ is a threshold step size, M is a desired decision feedback equalization adaptation enabling rate, and the threshold value adapter is configured to determine the new threshold value as:

$$T^{new} = T^{old} - \eta E_k + \frac{\eta}{M}(1 - E_k).$$

19. A detection system as recited in claim 14, wherein the filter tap adapter is further configured to leave the filter tap unchanged if the filtered data value does not meet the threshold value.

20. A detection system as recited in claim 14, wherein to modify the filter tap is to cause the subsequent data values to go towards values of +1 or −1.

* * * * *